United States Patent Office 2,764,425
Patented Sept. 25, 1956

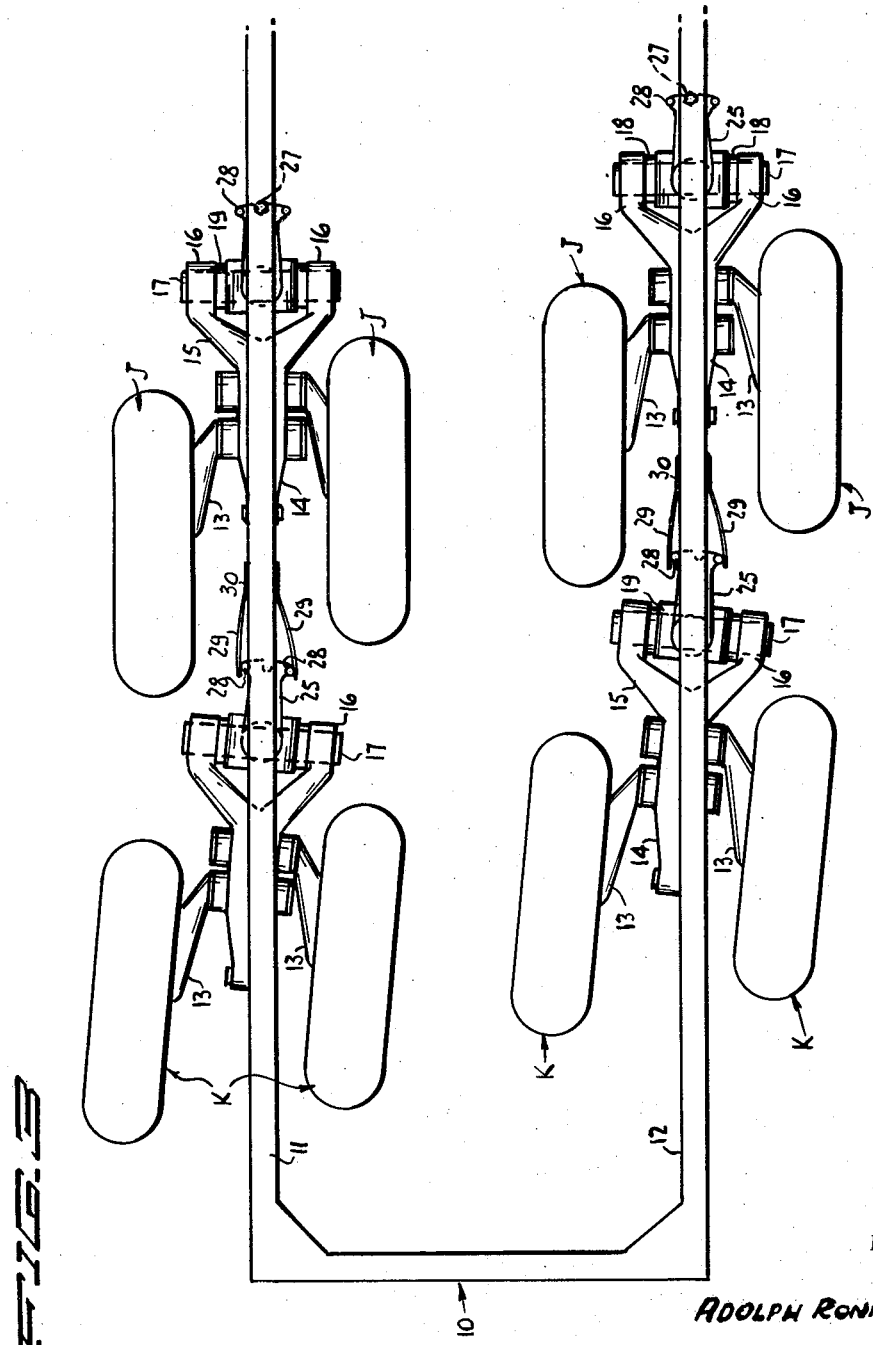

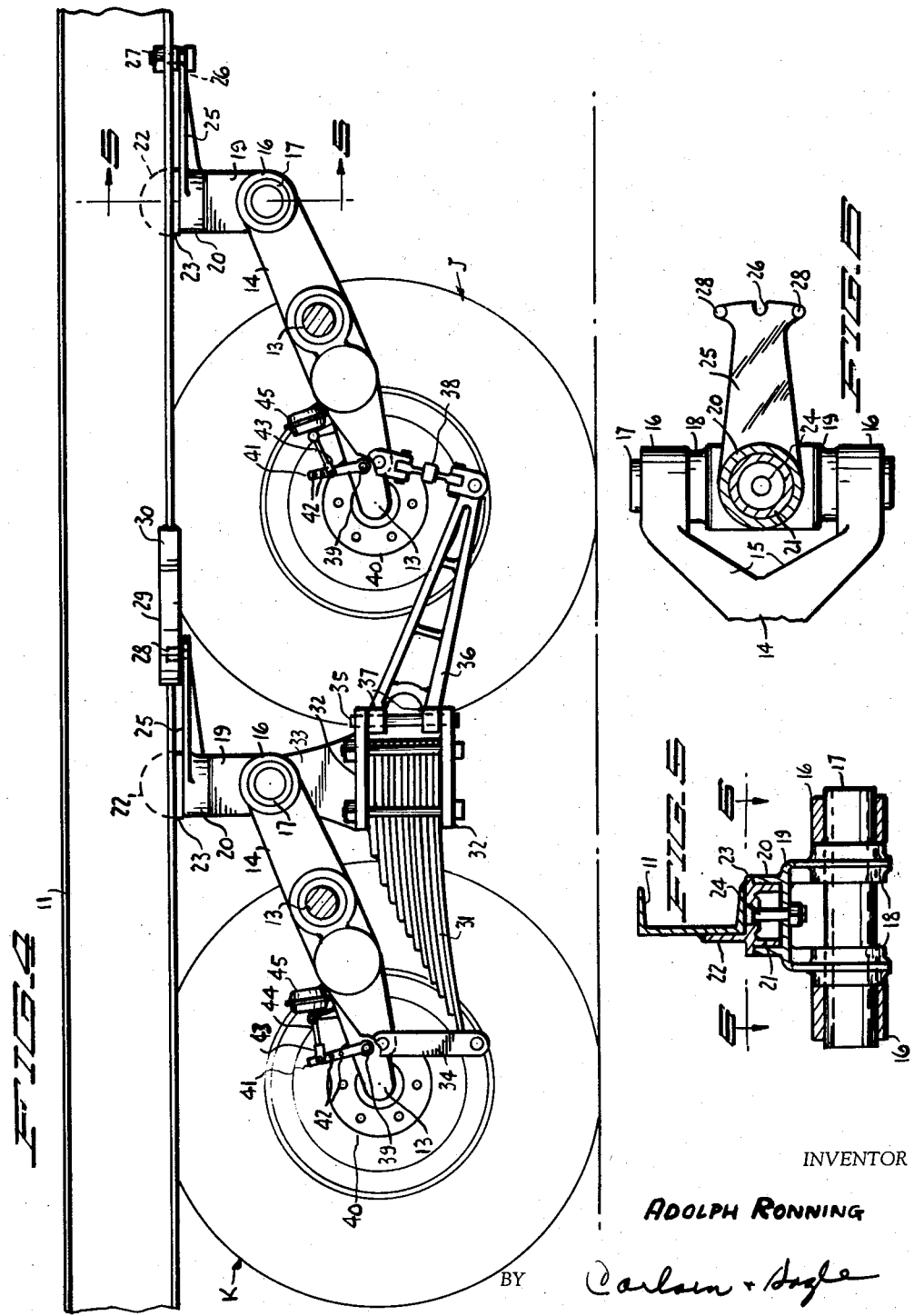

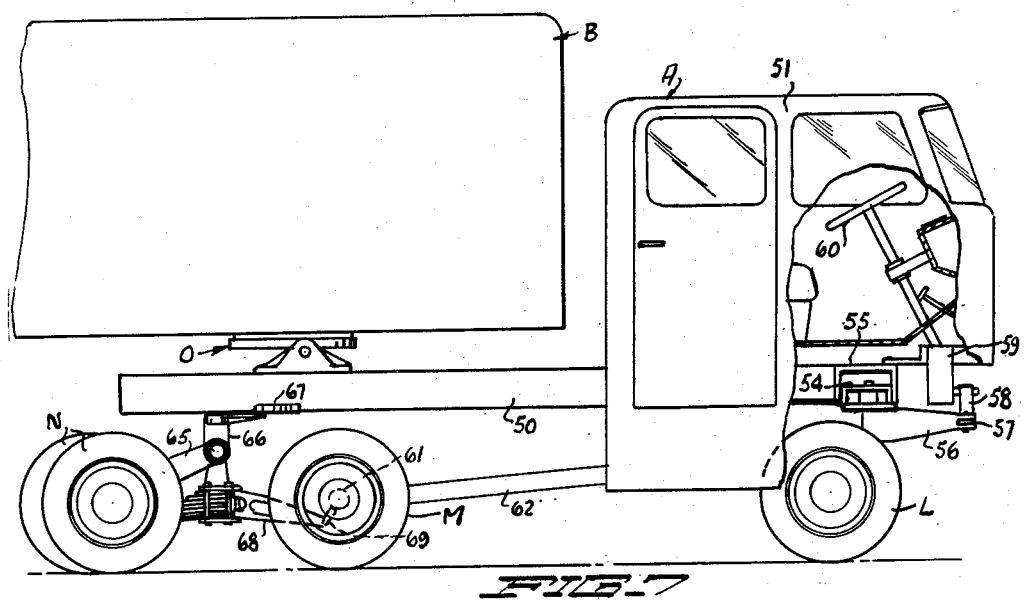
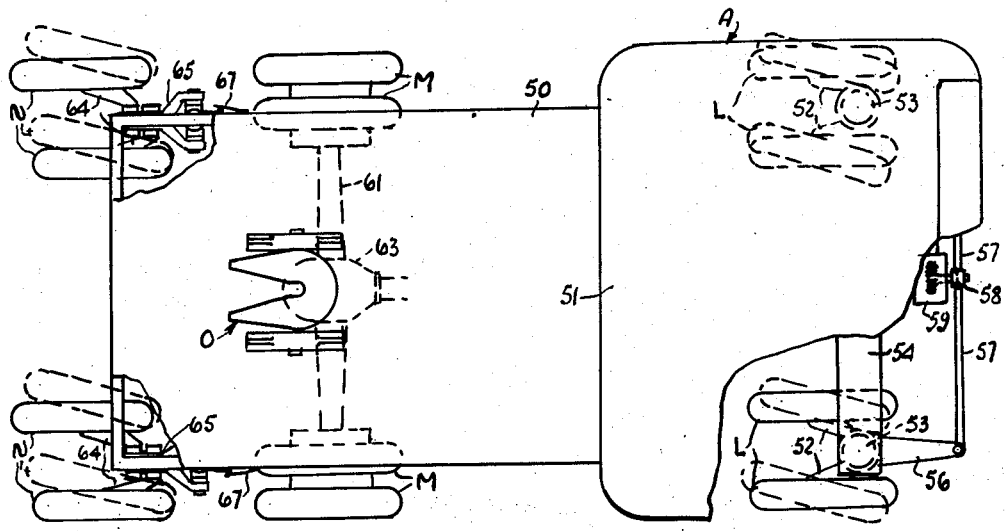
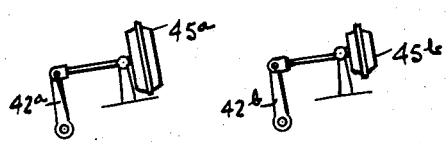

2,764,425

SKID COUNTERACTION IN VEHICLE WHEEL SUSPENSIONS

Adolph Ronning, Minneapolis, Minn.

Application February 19, 1953, Serial No. 337,776

19 Claims. (Cl. 280—432)

My invention relates to improvements in vehicle wheel suspensions and more specifically to the counteraction of of skidding tendencies in such equipment. Tandem and other multi-wheeled suspensions find their widest application to the heavy-duty, high speed semi-trailers by which so much freight and express is now transported over the highways, such equipment being made up of a forward unit having steerable front wheels and rear traction wheels, which unit serves as the tractor and has a fifth-wheel front end support for the trailer unit. Because of the heavy loads carried by such trailer units they are usually supported at rear ends upon tandem wheel assemblies in order to distribute the load to a plurality of wheels.

The operation of equipment of this kind offers many problems, due to the articulation at the fifth wheel between tractor and trailer, the heavy loads which are often transported, and the necessity for travel at highway speeds under all kinds of road conditions. I have for some time concerned myself with improvements in the wheel suspensions for the trailers and tractors with the view to providing better operation and even load distribution to all of the wheels under all conditions, not only to enable heavier loads to be transported but to reduce damage to the highways, which is itself a problem of increasing magnitude. For an example in my efforts in this direction attention is invited to my Patent No. 2,612,387 for Vehicle Wheel Compensating Suspension, issued September 30, 1952. In that patent there is disclosed a suspension made up of tandem arranged wheel pairs, totaling eight wheels in all, with two wheels in each pair and two pairs at each side of the vehicle. By contrast with ordinary eight wheeled suspensions the individual wheels of each pair or dual are arranged, according to my patent, for relative differential up and down movements and in addition there is longitudinal differential compensation between the tandem wheel pairs so that the load is equally distributed between the wheels even when they pass over considerable irregularities in the ground surface over which they travel. Various refinements in my thinking with reference to the problem of semi-trailer operations with maximum effectiveness and minimum damage to the highways are disclosed in other copending applications among which of interest hereto is my application Serial No. 262,712, filed December 21, 1951, for Vehicle Suspension with Adjustable and Casterable Wheels. In that application provision is made, not only for adjustment of the wheel pairs or duals for tracking properly, but also for limited castering movements of the wheel pairs, it being regarded as desirable for a part of the wheels in a tandem suspension to have some freedom for castering action, as pointed out in the application in question. I also deal with certain important aspects of the braking of tandem wheel suspensions in my application Serial No. 294,605 for Brake Torque Reactors, filed June 20, 1952, as well as make a disclosure of certain brake features in my Patent No. 2,612,387, and in my application Serial No. 203,484, filed December 29, 1950, now Patent 2,700,550, for Tractor Vehicle and Wheel Suspension Therefor I disclose certain improvements in wheel suspensions for the tractor units used in this type of equipment.

With this background my present invention attacks certain problems in arranging and braking wheel suspensions for best counteracting skidding tendencies in semi-trailer equipment. A typical example is the tendency of the vehicle to skid laterally in either direction where the road surface is slippery. The operators of all motor vehicles are advised by students of driving problems, by race drivers and like experts, to counteract such a skid by steering in the direction of the skid so that braking forces which may be applied to the wheels will be most effective in counteracting the skidding movement. The normal reaction of inexperienced operators is, of course, to attempt to steer away from the direction of skid and this only accentuates the skid and often throws the vehicle into a spin. Skidding in the case of a semi-trailer is particularly serious because of the tendency of the articulated tractor-trailer combination to jackknife, as is well known to those skilled in this art.

It is the primary object of my present invention to provide for the counteraction of skidding tendencies in vehicles of this general type which, in its broadest aspects, consists in the arrangement of certain of the wheels for castering action as a skid occurs. As the wheels thus caster they automatically assume positions in which they travel in the direction of the skid and this, as stated supra, is highly desirable in bringing the vehicle out of the skid. As a further object of my invention I contemplate the differential distribution of effective brake torque or braking forces between the respective wheels of the vehicle in such fashion that the wheels which caster in the direction of a skid are braked harder than are the remaining wheels. Thus the maximum braking induced resistance to the travel of the vehicle is in the direction of the skid and this, too, will be beneficial in bringing the vehicle under control.

These and other more detailed and specific objects will be disclosed in the course of the following specification, reference being had to the accompanying drawings, in which—

Fig. 3 is an enlarged top plan view of a tandem wheel suspension with a part of the wheels in castered position according to my invention.

Fig. 4 is a side view of the suspension of Fig. 3 with the near wheels omitted.

Fig. 5 is an enlarged section along the line 5—5 in Fig. 4.

Fig. 6 is a section along the line 6—6 in Fig. 5.

Fig. 7 is a side elevation of a tractor unit with a wheel suspension according to my prior application Serial No. 203,484, now Patent 2,700,550, but showing the addition thereto of tandem arranged helper wheels similar in general arrangement to the casterable wheels of Figs. 3 and 4 and the purpose of which is not only to better distribute the load to the road surface but also to provide additional wheels which may caster in the direction of the skid and assist in bringing the vehicle under control.

Fig. 8 is a plan view of the tractor view of Fig. 7 with portions thereof broken away.

Fig. 9 is a detail view of a braking system similar to that shown in Fig. 4, but illustrating the manner in which the effective braking forces may be differentially distributed between the casterable and non-casterable wheels by varying the effective diameter of the diaphragm-type brake actuators.

Figure 1:
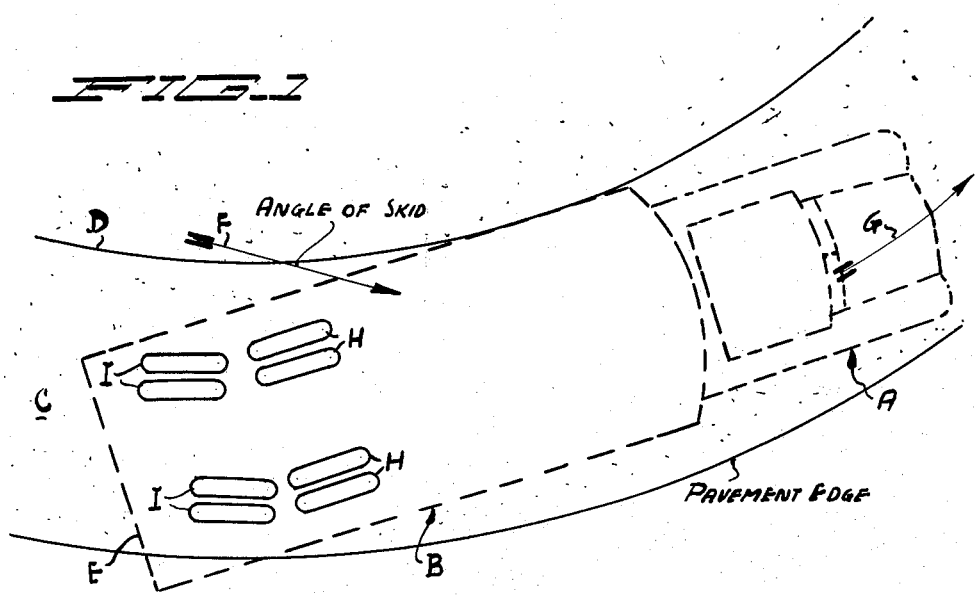
Fig. 1 is a plan view of a tractor-trailer combination shown only in outline and in dotted lines, illustrating the same as rounding a turn and with the rear end of the trailer starting a skid, the simplest form of tandem wheel suspension being shown in full lines, with a part of these wheels castered according to my invention.

In describing my invention reference is first invited to Fig. 1 of the drawing wherein is shown a more or less conventional semi-trailer in dotted outlines, made up of a tractor unit A and trailer unit B with the same shown as traveling around the curve on the right hand lane C of a highway or pavement, the center line of which appears at D. The rear end E of the trailer unit is shown as begining to swing out over the edge of the pavement due to the initiation of a skid along the approximate line of the arrow F. The direction of travel is indicated by the arrow G, and in this disclosure the rear end of the trailer unit is shown as supported upon a tandem wheel suspension made up of closely spaced front wheels H and similarly spaced rear wheels I. However, the rear wheels I are shown as castered from their normal position for straight-ahead travel of the semi-trailer toward the positions they will naturally assume upon lateral displacement of the rear end of the trailer unit B due to the initiation of the skid aforesaid. This, then, represents the very essence of my invention in that certain of the wheels of the vehicle are operatively arranged to caster away from a skid and toward positions at which they will roll along lines approaching the angle at which the skid is occurring. As stated hereinbefore it is regarded as highly desirable to steer a vehicle in the direction of a skid in order to bring it under control to best advantage and caster mounting of certain of the wheels brings this about entirely automatically, without any attention on the part of the operator.

While here discussing the fundamentals of my invention it may be observed that I further contemplate the differential distribution of brake torque or braking forces between the casterable and non-casterable wheels, so that maximum braking force is applied to the wheels which caster and therefore roll in the direction of the skid. In the present instance, therefore, the rear wheels I of Fig. 1 will be braked harder than are the forward wheels H.

Figure 2:
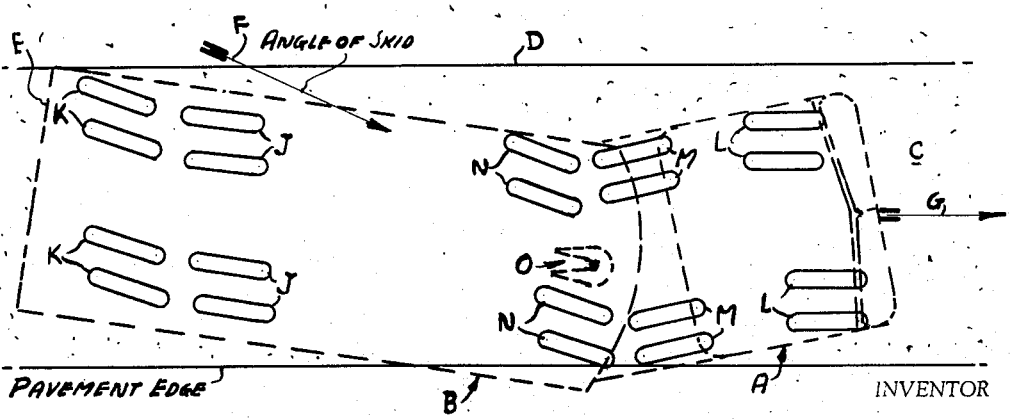
Fig. 2 is a similar view but showing a tandem suspension according to my invention, with additional wheels arranged for castering to counteract skidding.

The tandem wheel pattern shown in Fig. 1 is basically that commonly employed in present day equipment, but in accordance with my previous patent and applications I have developed a wheel pattern such as that shown at the rear end of the semi-trailer unit B of Fig. 2. In this case the front wheels J of the tandem wheel suspension are not only spaced somewhat further apart than is the case in the usual suspension, but the wheel pair at the left hand side of the vehicle is offset rearwardly while the left wheel of each pair is similarly offset, as clearly shown. The rear wheels K of this suspension are also mounted in this arrangement, or pattern, and they are here shown further as castered to a position such that they will roll in the direction of the skid, again indicated by the arrow F. Wherever the parts correspond in Figs. 1 and 2 they are similarly identified, but in Fig. 2 there are additional features which will be described in more detail hereinafter. At this point, however, a construction and mounting for the tandem wheel pattern made up of the wheels J and K of Fig. 2 will now be shown and described in detail.

Referring then more specifically to Figs. 3 through 6, it is to be noted first that fundamentally the wheel suspension is identical to that disclosed in my prior application Serial No. 262,712, while the brake system is quite similar to that shown in my Patent No. 2,612,387, with only such variations as necessary to differentially distribute the braking forces between the casterable and non-casterable wheels. In these views the chassis of the trailer is designated generally at 10 and includes opposed parallel side members 11 and 12. The respective front and rear wheel pairs J and K are located in tandem relation beneath the channels 11 and 12 and in each case the wheels are journaled at the rear ends of cranked axles, indicated throughout at 13, the forward ends of which are formed with oppositely extending trunnion portions journaled in housing members 14. These trunnion ends of the axles 13 are respectively forwardly and rearwardly located, so as to offset the individual wheels of each pair as previously described, and within such housings 14 the axles are connected by meshing gears (not shown) constituting a differential connecting mechanism, an example whereof may be found in my United States Patent No. 2,217,817, issued October 15, 1940. The purpose of this differential connection of the individual wheels of each pair is to cause relative upward movement of either wheel to bring about an equal downward movement of the other, so as to maintain road contact while traveling over irregular road surfaces, as well as to minimize vertical deflection of the vehicle as a whole with even distribution of the load through the entire suspension. The forward ends of the housing members 14 are also pivoted on transverse axes to the vehicle chassis and for this purpose the members are bifurcated at 15 and provided with transversely spaced bearings 16, which are carried at opposite ends upon short pivot tubes 17. As best shown in Figs. 5 and 6 the tubes 17 are in turn carried in spaced bearings 18 depending from a bracket or hanger 19 located immediately below the adjacent side member of the chassis 10. The hangers 19 are provided with upwardly extending, cylindrical bearings 20 telescoped upwardly over depending bearings 21 formed as a part of brackets 22, which are welded or otherwise securely fastened to the chassis. Annular shoulders 23 around the bearing 21 prevent upward displacement of the hangers, while downward displacement is prevented by bolts 24 which hold the parts in assembly, as clearly shown in Fig. 5. Thus the bearing assemblies 20—21 provide for pivotal movement about upright axes and, since they are located forwardly of the associated wheels, these wheels are permitted castering motion in the well known manner. It is, of course, the comparatively large bearing elements 20—21 which act as the caster pivots and it is the sole function of the comparatively small bolts 24 to hold the parts in assembly. In each case there is a stop arm 25 which extends forwardly from the bearing 20 beneath the associated side member of the chassis 10 and which is preferably cast as an integral part of the bearing. Where castering action is not desired, as is here in the case of the front wheel pairs J, the associated stop arms 25 are provided with centrally located notches 26 and bolts 27 are inserted through appropriately located openings in the webs of the side members 11 and 12 to engage these notches and prevent pivotal motion about the axes of the bearings 20—21. In the case of the rear wheel pairs K where it is desired that the wheels caster in accordance with my present invention, no such bolts 27 are, of course, used but the castering action is limited by the provision upon the widened or flaring forward ends of these stop arms 25 of upwardly projecting stops 28, one or the other of which will contact the adjacent lateral edges of the side members 11 or 12 for this purpose. While, of course, other means might be provided for locking the forward wheel pairs J against forward motion, the construction here shown is preferable in that all of the parts are interchangeable, not only to facilitate the manufacture but also the servicing of the assembly. It is also to be noted that while I have shown the rear wheel pairs K as arranged for the desired castering action, and believe that this is preferable for the purpose of counteracting skidding tendencies, I do not limit myself thereto and may if desired, and by a simple change in the assembly, permit the front wheels to caster instead of the rear wheels.

The castering rear wheel pairs K are normally centered or urged to such position by opposed leaf springs 29 welded or otherwise secured at forward ends 30 to the side members 11 and 12 and at the rear ends engaging the aforesaid stops 28, as will be clearly evident.

It is, of course, necessary to provide for the springing of the wheels as well as for a walking-beam action between the tandem pairs of wheels and in Fig. 4 there is shown a spring 31 which is secured by clamps 32 having an upwardly extending bracket 33 which is pivotally supported upon the rear pivot tube 17. There is, of course, one of these assemblies at each side of the vehicle and in each case the rearwardly extending end of the spring 31 is connected by a shackle 34 to the rear end of the adjacent housing member 14. The clamps 32 project forwardly beyond the spring to carry a vertical pivot pin 35 upon which an arm 36 is pivoted at 37. The arm projects forward from its pivot and at its forward end is connected by a shackle 38 to the rear end of the adjacent forward housing member 14. The forward shackle 38 is so constructed as to permit universal motion between its respective upper and lower ends and this flexibility, plus the articulation provided at the pivot pin 35, will permit the rear wheel pairs K to caster freely even though they are connected by this spring and arm assembly to the non-castering forward wheel pairs J. Inasmuch as these front to rear connections also pivot upon the rear pivot tube 17 the springs 31 are caused to yieldably resist upward movement of either front or rear wheels, as well as to cause a walking-beam or compensating effect between the tandem wheel pairs, also as pointed out in my application Serial No. 262,712 from which this structure is taken verbatim.

Referring still to Fig. 4 I show braking mechanism for the wheels similar in many respects to that of my Patent No. 2,612,387. Each wheel has a shaft 39 extending through the usual backing plate 40 of a conventional brake shoe-brake drum assembly and each shaft is fitted with an operating lever 41 oscillation of which will cause the usual cam on the shaft to apply the shoes to the drum and brake the wheels. The levers 41 extend upwardly and have a series of three, more or less, openings 42 by means of which the forked ends 43 of plungers 44 may be pivotally connected to the levers, and here said plungers are shown as extending from the ordinary diaphragm-type actuating units 45 of an air or vacuum brake system, such as widely used in equipment of this nature. In the case of the rear, casterable wheels K the plungers 44 are connected to the levers 41 at the openings 42 most remote from the shafts 39, while at the front wheels J the opposite is true, the plungers being as clearly shown connected to the levers closer to the shafts. As a result there is a considerable difference in the leverage exerted by the diaphragms 45 upon the front and rear wheel brakes, with the advantage going to the rear wheels which caster.

Thus it will be understood that by the structure here shown I meet the two requirements for most effective skid counteraction, namely, the castering of certain of the wheels so that they travel in the general direction of the skid, and second the application of greater braking force to these wheels than to the wheels which do not caster.

Instead of varying the effective leverage in the braking system as just described, I may prefer to use diaphragms or actuating units of differing diameters as shown in Fig. 9. There the rear unit 45ª is larger than the forward unit 45ᵇ with the result that greater pressure will be brought to bear on the rear lever 42ª than on the front 42ᵇ and the rear, casterable wheels will be braked to greater effect. This variation and other means for differentiating the braking forces applied to the casterable and non-casterable wheels are regarded as falling within the scope of my invention.

Referring now again to the diagrammatic showing of Fig. 2 the tractor unit A as seen therein has a wheel suspension similar to that disclosed in my application Serial No. 203,484, now Patent 2,700,550, previously mentioned. This tractor unis is shown in more detail in Figs. 7 and 8 but it is to be noted that it includes steerable front wheel pairs L at each side and traction wheel pairs M at the rear. In addition casterable helper wheels N are provided behind the wheels M and in these views the usual fifth wheel mechanism is designated at O for connecting the tractor unit to the trailer unit B. As will be shortly described the front wheels L are located rearwardly of upright caster axes and in addition the helper wheels N are caster mounted like the wheels K previously described. Thus there is a total of three different wheel pairs, L, N and K in this tractor-trailer assembly which may caster and should the vehicle start to jackknife about the articulation at the fifth wheel O these wheels will automatically tend to caster in the direction for best counteracting and overcoming this jackknifing tendency. Furthermore the effective braking forces on these wheels and upon the other non-castering wheels may be proportioned as thought best for the purpose.

As seen in Figs. 7 and 8 the tractor unit A includes a chassis frame 50 on the rear portion of which is located the aforesaid fifth wheel mechanism O. Forwardly there is a cab 51 for the operator and it is beneath this that the steerable front wheels L are located. As set forth in detail in my application Serial No. 203,484, now Patent 2,700,550, these wheels are journaled at the rear ends of cranked axles 52 which extend forwardly and are differentially connected so that these wheels have a compensating action like the wheels J and K. The differential mechanisms are journaled about upright caster axes 53 and are mounted at the ends of a transverse oscillating axle or bolster 54 pivoted centrally in a bracket 55 secured to the chassis frame. Steering arms 56 extend forwardly from each caster mounting and are cross connected by steering rods 57 which are centrally connected to a lever 58 operated by a steering unit 59 to which the steering wheel 60 is connected to swing said arms 56 from side to side and steer the wheels. The caster mounting of the wheels L not only facilitates steering but also causes them to tend strongly to caster in the proper direction for overcoming skidding and jackknifing tendencies.

The traction wheels M are, as shown, arranged as customary at the opposite ends of a rear axle 61 and are driven through a propeller shaft-torque tube 62 and differential unit 63. The helper wheels N are identical in mounting to the wheels K previously described, being connected by cranked axles 64 to housing members 65 which are pivoted to brackets 66 mounted for caster action about upright axes, resisted by springs 67 which normally center the wheels. While the spring suspension may be any that is suitable I have shown the same suspension as that of Fig. 4 but show the articulated arms 68 as shackled at 69 to the rear axle 61 so that this suspension springs both wheel pairs M and N. Obviously this caster mounting of the helper wheels N causes them to self-steer to counteract skidding and jackknifing tendencies and differential distribution of braking forces between the wheels M and N, to brake the castering wheels N the hardest, will be of further benefit.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a vehicle, a tandem wheel suspension including front and rear wheels, means mounting some of the wheels for caster movements to one side or the other in response to lateral skidding of the vehicle, means mounting the remaining wheels for travel in a straightaway direction, springs operatively arranged to yieldably resist such caster movements of the wheels, separate braking means for the wheels and means for differentially proportioning braking forces between the wheels.

2. A tandem wheel assembly for a vehicle including front and rear wheels, means supporting some of the wheels for castering action whereby these wheels will angle in the direction of a skid, braking means for the wheels and means for differentially distributing braking forces between the wheels with greatest force applied to the casterable wheels.

3. The combination in a vehicle tandem wheel suspension having front and rear wheel assemblies one of which is caster mounted so that it will caster in the direction of a skid of the vehicle, of a brake system having means operative to apply greater braking force to the casterable wheels than that applied to the other wheels.

4. In a vehicle tandem wheel suspension having front and rear wheels and characterized in that either the front or rear wheels are mounted and operatively arranged to steer in the direction in which the vehicle may skid, a braking system for applying braking forces to the wheels, and the said braking system including means coacting with the wheels and braking system and operative to differentially distribute said forces as to magnitude so that the wheels steered in the direction of the skid are more forcibly braked than the other wheels.

5. A tandem wheel suspension braking system for counteracting skidding tendencies in a semi-trailer, comprising front and rear wheel pairs operatively connected to the trailer and means mounting the rear wheel pairs for castering action so that they will be self-steering in the direction in which the trailer may skid, and a braking system for individually distributing braking forces to the front and rear wheel pairs and braking the rear wheels harder than the front wheels.

6. A tandem wheel suspension and braking system for counteracting skidding tendencies in a semi-trailer, comprising front and rear wheel pairs operatively connected to the trailer and means mounting the rear wheel pairs for castering action so that they will be self-steering in the direction in which the trailer may skid, and a braking system for individually distributing braking forces to the front and rear wheel pairs and including levers operating as a part of the braking system and being of different effective length applying greater braking force to the rear wheels than to the front.

7. In a tandem wheel suspension for a vehicle, front and rear wheel pairs, means supportably mounting the vehicle on said wheel pairs and including pivot mountings about which the rear wheels may caster from side to side, brake means for the wheels including brake operating shafts and levers thereon, and fluid actuated plungers connected to said lever for operating the brake means, the plungers being connected to said levers at points further from the shafts at the rear wheels than are the corresponding connections made at the front wheels whereby upon the initiation of a skid the casterable rear wheels will caster toward the direction of the skid and upon application of the brakes these castered wheels will be braked harder than are the front wheels.

8. In a tandem wheel suspension for a vehicle, front and rear wheel pairs, means supportably mounting the vehicle on said wheel pairs and including pivot mountings about which the rear wheels may caster from side to side, and brake means for applying relatively greater braking forces to the rear wheels than to the front wheels.

9. In a tractor-trailer vehicle having a tractor unit and a trailer unit, separate tandem wheel suspensions for both of said units and each such suspension consisting of front and rear wheels, and means mounting some of said wheels for caster movements in response to lateral skidding or jack-knifing of the vehicle whereby the castered wheels will assist in bringing the vehicle back to its proper path.

10. In a tractor-trailer vehicle having a tractor unit and a trailer unit, separate tandem wheel suspensions for both of said units and each such suspension consisting of front and rear wheels, means mounting some of said wheels for caster movements in response to lateral skidding or jackknifing of the vehicle whereby the castered wheels will assist in bringing the vehicle back to its proper path, and brake mechanisms for the wheels and including means for applying greater braking forces to the casterable wheels than to the others.

11. In a tractor-trailer vehicle of the character described and having a tractor unit and a trailer unit, a tandem wheel suspension for the tractor unit including traction wheels and caster mounted helper wheels, a tandem wheel suspension for the trailer unit including casterable and non-casterable wheels, and means for differentially distributing applied braking forces between the wheels.

12. In a tractor-trailer vehicle of the character described and having a tractor unit and a trailer unit, a tandem wheel suspension for the tractor unit including traction wheels and caster mounted helper wheels, a tandem wheel suspension for the trailer unit including casterable and non-casterable wheels, means for differentially distributing applied braking forces between the wheels, and spring means for yieldably resisting castering movements of the said wheels.

13. In a tractor-trailer vehicle of the character described having a tractor unit and a trailer unit and connecting fifth wheel, caster mounted and steerable front wheels for the tractor unit, traction wheels at the rear of the tractor unit, caster mounted helper wheels for the tractor unit, a tandem wheel suspension for the rear of the trailer unit, and some of the wheels of said tandem suspension being caster mounted.

14. In a tractor-trailer vehicle of the character described having a tractor unit and a trailer unit and connecting fifth wheel, caster mounted and steerable front wheels for the tractor unit, traction wheels at the rear of the tractor unit, caster mounted helper wheels for the tractor unit, a tandem wheel suspension for the rear of the trailer unit, a part of the wheels of said tandem suspension being caster mounted, and means for braking said wheels and for applying greater braking forces to the casterable wheels than to the remaining wheels.

15. For a semi-trailer type of vehicle, a tractor unit having steerable front wheels and rear traction wheels, caster mounted helper wheels supportably connected to the rear of the unit to divide the load with said traction wheels, and means for resisting caster movements of said helper wheels.

16. A tandem wheel suspension and braking system for counteracting skidding tendencies in a semi-trailer, comprising front and rear wheel pairs operatively connected to the trailer and means mounting the front wheel pairs for castering action so that they will be self-steering in the direction in which the trailer may skid, and a braking system for individually distributing braking forces to the front and rear wheel pairs and braking the front wheels harder than the rear wheels.

17. In a tandem wheel suspension for a vehicle, front and rear wheel pairs, means supportably mounting the vehicle on said wheel pairs and including pivot mountings about which the front wheels may caster from side to side, and brake means for applying relatively greater braking forces to the front wheels than to the rear wheels.

18. In a tractor-trailer vehicle having a tractor unit and a trailer unit, separate tandem wheel suspensions for both of said units and each such suspension consisting of front and rear wheels, means mounting the front wheels of each suspension for caster movements in response to lateral skidding or jackknifing of the vehicle, and brake mechanisms for the wheels, said brake mechanisms including means for applying greater braking forces to the front than to the rear wheels.

19. A vehicle suspension of the character described comprising a plurality of wheels, means mounting a part of the wheels for castering action in the direction of skid of the vehicle, and braking mechanism for the wheels including means for braking the wheels which caster harder than the wheels which do not caster.

References Cited in the file of this patent

UNITED STATES PATENTS

| | | |
|---|---|---|
| 2,072,787 | Anderson | Mar. 2, 1937 |
| 2,134,595 | Bradshaw | Oct. 25, 1938 |
| 2,408,401 | King | Oct. 1, 1946 |
| 2,612,387 | Ronning | Sept. 30, 1952 |
| 2,634,986 | McDaniel | Apr. 14, 1953 |

FOREIGN PATENTS

| | | |
|---|---|---|
| 441,270 | Italy | Oct. 27, 1948 |